(12) United States Patent
Guerquin (10) Patent No.: US 8,894,011 B1
(45) Date of Patent: Nov. 25, 2014

(54) AIRCRAFT FUSELAGE CONSTRUCTED OF AIRCRAFT FUSELAGE SECTIONS SCREWED TOGETHER

(71) Applicant: The Boeing Company, Chicago, IL (US)

(72) Inventor: Kris G. Guerquin, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/180,909

(22) Filed: Feb. 14, 2014

(51) Int. Cl.
*B64C 1/06* (2006.01)

(52) U.S. Cl.
USPC .......................................... 244/120; 244/119

(58) Field of Classification Search
USPC ............................ 244/120, 119, 117 R, 118.2
See application file for complete search history.

(56) References Cited

U.S. PATENT DOCUMENTS

| | | | |
|---|---|---|---|
| 6,098,928 A * | 8/2000 | Bross et al. ................... | 244/131 |
| 2012/0132750 A1* | 5/2012 | Gorr et al. ...................... | 244/120 |
| 2012/0186062 A1 | 7/2012 | Vera Villares et al. | |
| 2012/0219764 A1 | 8/2012 | Biornstad et al. | |
| 2013/0292514 A1* | 11/2013 | Moselage, III ............... | 244/120 |
| 2014/0209743 A1* | 7/2014 | Boyen et al. .................. | 244/120 |

FOREIGN PATENT DOCUMENTS

WO        WO2008000286        1/2008

* cited by examiner

*Primary Examiner* — J. Woodrow Eldred
(74) *Attorney, Agent, or Firm* — Joseph M. Rolnicki; Evans & Dixon, LLC (57) ABSTRACT

An aircraft fuselage is constructed of a plurality of cylindrical semi-monocoque fuselage sections that are each constructed with mirrored screw threads on either their interior or exterior surfaces. The screw threads of adjacent fuselage sections are secured together end-to-end by a sleeve having complementary screw threads. The sleeve is positioned between adjacent fuselage sections that are held against rotation, but are free to move in translation towards each other. The sleeve is engaged with the screw threads of the adjacent fuselage sections and is rotated, causing the adjacent fuselage sections to move toward each other and into secure engagement in response to the rotating sleeve.

20 Claims, 14 Drawing Sheets

AIRCRAFT FUSELAGE CONSTRUCTED OF AIRCRAFT FUSELAGE SECTIONS SCREWED TOGETHER

FIELD

This disclosure pertains to the construction of an aircraft fuselage of circular cross-section. More specifically, this disclosure pertains to multiple composite and monolithic fuselage sections (called also "barrels") being integrated together to form a fuselage. This integration process of joining two adjacent sections involves a sleeve connected to the sections by screw threads shaped on the edges of fuselage sections and on the sleeve.

BACKGROUND

It can be appreciated that in constructing component parts of an aircraft and in particular in the construction of an aircraft fuselage a substantial number of mechanical fasteners are employed. For example, in assembling a first fuselage section to a second fuselage section, a time tested method of bolting internal metal splices between the fuselage sections is employed. This approach appears very convenient and effective in fuselages built of metal. The joining of the two fuselage sections by the bolted internal splices can occur in the sub assembly stage, or during final assembly.

In the example of a typical aircraft fuselage being constructed of five cylindrical composite fuselage sections, there can be as many as 24 frame segments, 300 splices and 8000 threaded fasteners (bolts) employed in splicing or joining together the fuselage sections. This requires 8000 holes to be drilled (through the fuselage sections and any joining splice), reamed, checked for quality assurance, all bolts to be installed and most of this is taking place during the final assembly of the aircraft prepared to join a moving assembly line.

Because final assembly typically takes place with the fuselage moving along an assembly line, it is advantageous to reduce the workload of the final assembly of the moving fuselage. Additionally, the weight reduction and part count reduction associated with this concept would be desirable.

SUMMARY

The aircraft fuselage of this disclosure and its method of construction enable the elimination of substantially all of the mechanical fasteners needed in current methods of constructing an aircraft fuselage by joining several cylindrical fuselage sections. With the elimination of the mechanical fasteners, the time required for assembling fuselage sections together can be substantially reduced. Additionally, the elimination of the mechanical fasteners also significantly reduces the weight of the fuselage.

The aircraft fuselage of this disclosure will be described with reference to a first cylindrical fuselage section and a second cylindrical fuselage section. However, it should be understood that this is only one exemplary embodiment of the aircraft fuselage. The aircraft fuselage of this disclosure can be constructed having more than just a first and second fuselage section.

The first fuselage section is constructed having a length with opposite forward and rearward ends. The rearward end of the fuselage section has a circular rearward edge. A first screw thread is formed on the first fuselage section adjacent the rearward edge. In this embodiment the first screw thread is formed on an interior surface of the first fuselage section. The first screw thread spirals around the first fuselage section in a first direction, creating a right-hand thread. In the described embodiment, the first screw thread is an integral part of the first fuselage section and both of them are constructed of composite material as one unit.

The second fuselage section is also constructed having a length with opposite forward and rearward ends. The forward end of the second fuselage section has a circular forward edge. A second screw thread is formed on the second fuselage section adjacent the forward edge. In this embodiment the second screw thread is formed on the interior surface of the second fuselage section. The second screw thread spirals around the second fuselage section in a second direction, creating a left-hand thread. The second direction is opposite to the first direction. For example, the first screw thread could spiral around the first fuselage section in a clockwise direction and the second screw thread could spiral around the second fuselage section in a counterclockwise direction. In the described embodiment, the second screw thread is an integral part of the second fuselage section and both of them are constructed of composite material as one unit.

A cylindrical sleeve is used to join the first fuselage section and the second fuselage section together. The sleeve has a length with opposite forward and rearward edges. A first screw thread (right-hand thread) is formed on the sleeve adjacent the sleeve forward edge. In this embodiment the first screw thread is formed on the exterior surface of the sleeve to mate with the first screw thread formed on the interior surface of the first fuselage section. The first screw thread on the sleeve is complementary to the first screw thread on the first fuselage section and mates with the first screw thread on the first fuselage section securing the sleeve to the first fuselage section. A second screw thread is also formed on the exterior surface of the sleeve adjacent the sleeve rearward edge. The second screw thread (left-hand thread) is formed on the exterior surface of the sleeve to mate with the second screw thread formed on the interior surface of the second fuselage section. The second screw thread on the sleeve is complementary to and mates with the second screw thread on the second fuselage section securing the sleeve to the second fuselage section.

The process of securing the first fuselage section to the second fuselage section is accomplished by rotating the sleeve relative to the first fuselage section and the second fuselage section. The first and second fuselage sections are secured against rotation, but are free to move toward each other in translatory movements. The sleeve is positioned between the first fuselage section and the second fuselage section. The first screw thread on the sleeve is engaged in or mated with the first screw thread on the first fuselage section at the rearward edge of the first fuselage section. The second screw thread on the sleeve is engaged in or mated with the second screw thread on the second fuselage section at the forward edge of the second fuselage section. These two engagements should happen simultaneously. The sleeve is then rotated relative to the first and second fuselage sections in such a way that, due to the opposite spiraling directions of the first screw thread on the first fuselage section and the second screw thread on the second fuselage section, the rotation of the sleeve pulls the first and second fuselage sections toward each other. The rotation of the sleeve is continued until the rearward edge of the first fuselage section engages with the forward edge of the second fuselage section, thereby securing together the first and second fuselage sections.

In this embodiment of the aircraft fuselage, the rearward edge of the first fuselage section has a non-linear (or non-planar) configuration. The forward edge of the second fuselage section also has a non-linear (or non-planar) configuration. The non-linear configurations of the first fuselage rearward edge and the second fuselage section forward edge are complementary. When the non-linear configurations of the first fuselage section rearward edge and the second fuselage section forward edge engage with each other, the configurations form a secure joint between the two fuselage sections that transfers torsion and shear forces directly between the two fuselage sections without effecting the sleeve rotation. Other forces such as tension and compression are transferred through the sleeve.

An adhesive can be used to prevent the sleeve rotation relative to the fuselage sections after assembly. This adhesive (still in a liquid state) can additionally be used as a lubricant during the screwing process.

The aircraft fuselage of this disclosure and its method of construction and assembly enable the elimination of substantially all of the mechanical fasteners needed in current methods of assembling an aircraft fuselage when joining several cylindrical fuselage sections. With the elimination of the mechanical fasteners, the time required for assembling the fuselage sections together can be substantially reduced. Additionally, the elimination of the mechanical fasteners also can significantly reduce the weight of the fuselage.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Further features of the aircraft fuselage of this disclosure and its construction are set forth in the following detailed description of the aircraft fuselage and in the drawing figures.

DETAILED DESCRIPTION

Figure 1:
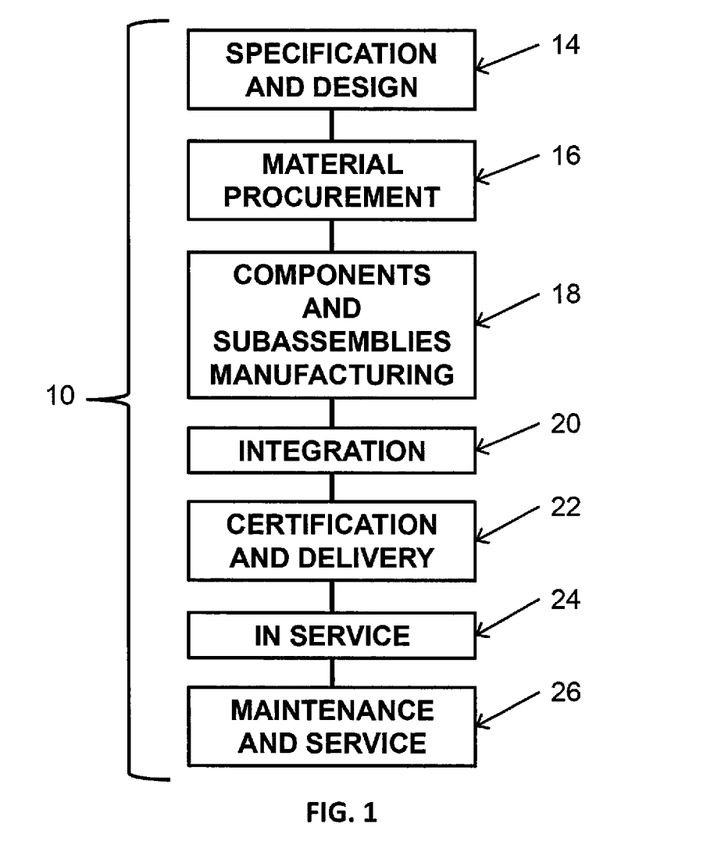
FIG. 1 is a flow diagram of aircraft production and service methodology.
Figure 2:
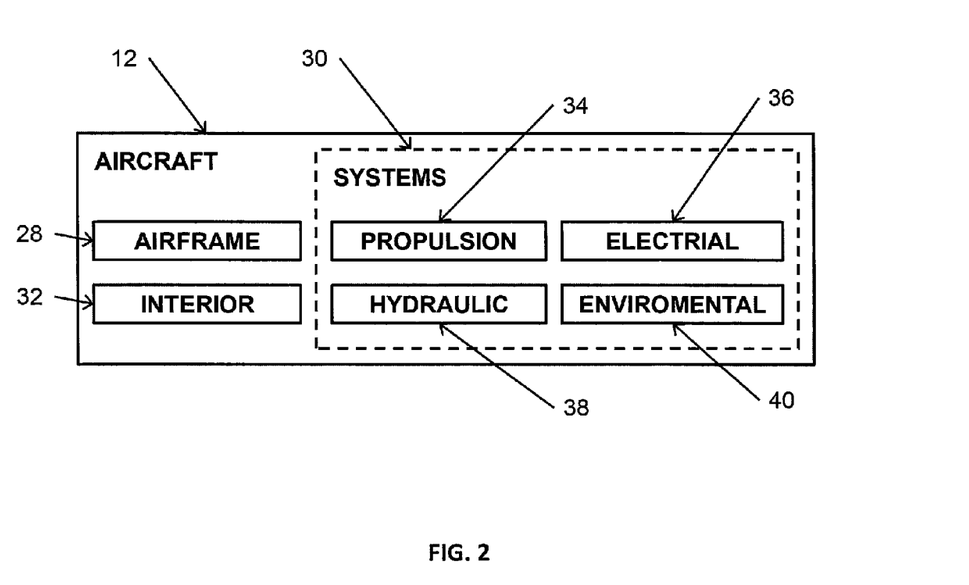
FIG. 2 is a block diagram of an aircraft.

Referring more particularly to the drawings, embodiments of the disclosure may be described in the context of an aircraft manufacturing and service method 10 as shown in FIG. 1 and an aircraft 12 as shown in FIG. 2. During pre-production, exemplary method 10 may include specification and design 14 of the aircraft 12 and material procurement 16. During production, component and subassembly manufacturing 18 and system integration 20 of the aircraft 12 takes place. Thereafter, the aircraft 12 may go through certification and delivery 22 in order to be placed in service 24. While in service by a customer, the aircraft 12 is scheduled for routine maintenance and service 26 (which may also include modification, reconfiguration, refurbishment, and so on).

Each of the processes of method 10 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 12 produced by exemplary method 10 may include an airframe 28 with a plurality of systems 30 and an interior 32. Examples of high-level systems 30 include one or more of a propulsion system 34, an electrical system 36, a hydraulic system 38, and an environmental system 40. Any number of other systems may be included. Although an aerospace example is shown (aircraft, rockets), the principles of the invention may be applied to other industries, such as the automotive, railroad or tooling industry.

Apparatus and methods embodied herein may be employed during any one or more of the stages of the production and service method 10. For example, components or subassemblies corresponding to production process 18 may be fabricated or manufactured in a manner similar to components or subassemblies produced while the aircraft 12 is in service. Also, one or more apparatus embodiments, method embodiments, or a combination thereof may be utilized during the production stages 18 and 20, for example, by substantially expediting assembly of or reducing the cost of an aircraft 12. Similarly, one or more of apparatus embodiments, method embodiments, or a combination thereof may be utilized while the aircraft 12 is in service, for example and without limitation, to maintenance and service 26.

Figure 3:
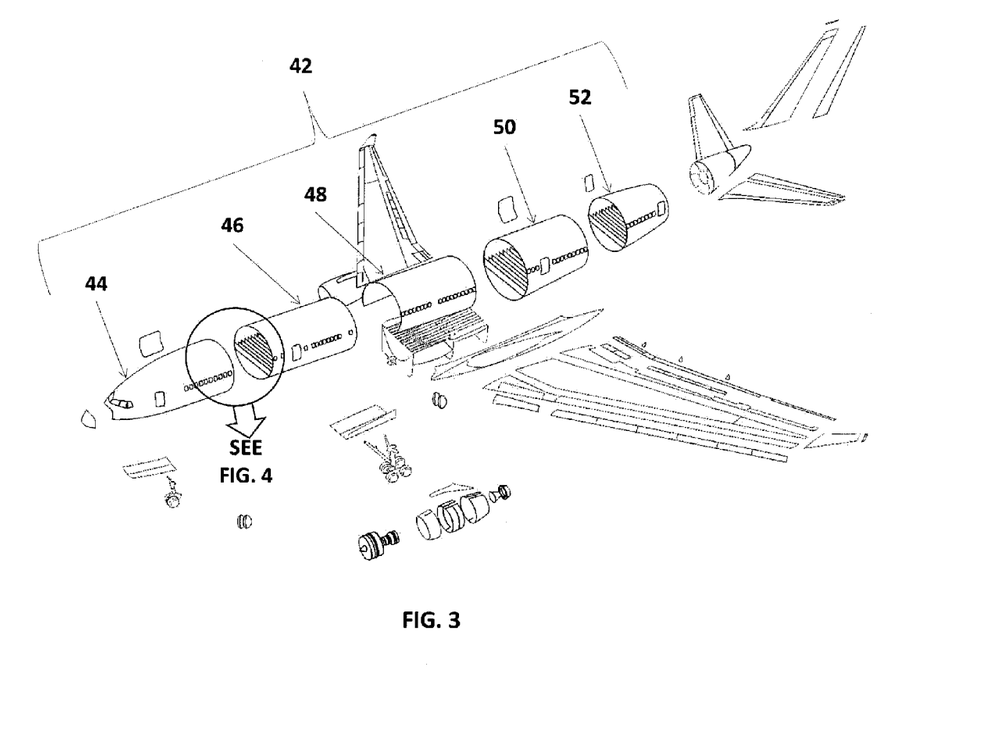
FIG. 3 is a representation of a perspective exploded view of an aircraft fuselage employing the construction of this disclosure.

FIG. 3 is a representation of an aircraft having a fuselage 42 constructed in accordance with the method to be disclosed herein. As is represented in FIG. 3, the aircraft fuselage 42 is constructed of five sections 44, 46, 48, 50, 52 that are secured together end-to-end in forming the fuselage. In the description of the fuselage to follow, only two of the fuselage sections, a first section 44 and a second section 46 and the securing connection between these two fuselage sections will be described. It should be understood that the securing connections between each of the adjacent fuselage sections 46, 48, 50, 52 can be the same secure connection as between the first fuselage section 44 and the second fuselage section 46. Furthermore, the aircraft fuselage 42 represented in FIG. 3 comprised of five fuselage sections is only one example of aircraft construction employing the method to be disclosed herein. An aircraft having a larger number of fuselage sections or a smaller number of fuselage sections could be constructed according to the method described herein. The aircraft fuselage 42 of this disclosure is also described as being constructed of composite material. It should be understood that the concepts of the aircraft fuselage construction to be disclosed could be applied to aircraft or any other products built of other equivalent types of materials.

It should be understood that this type of connection, described above, can also consist of the sleeve located outside (not inside) the threaded portions of the fuselage sections. In this case the threads are formed on the inside (not outside) of the sleeve and the outside (not inside) of the fuselage sections.

It also should be understood that left-hand threads and right-hand threads can be used alternatively, but they should be opposite on the opposite edges of the sleeve and there should be an agreement between thread directions of the sleeve and of the fuselage sections. This will determine the direction of sleeve rotation during the assembly.

Figure 4:
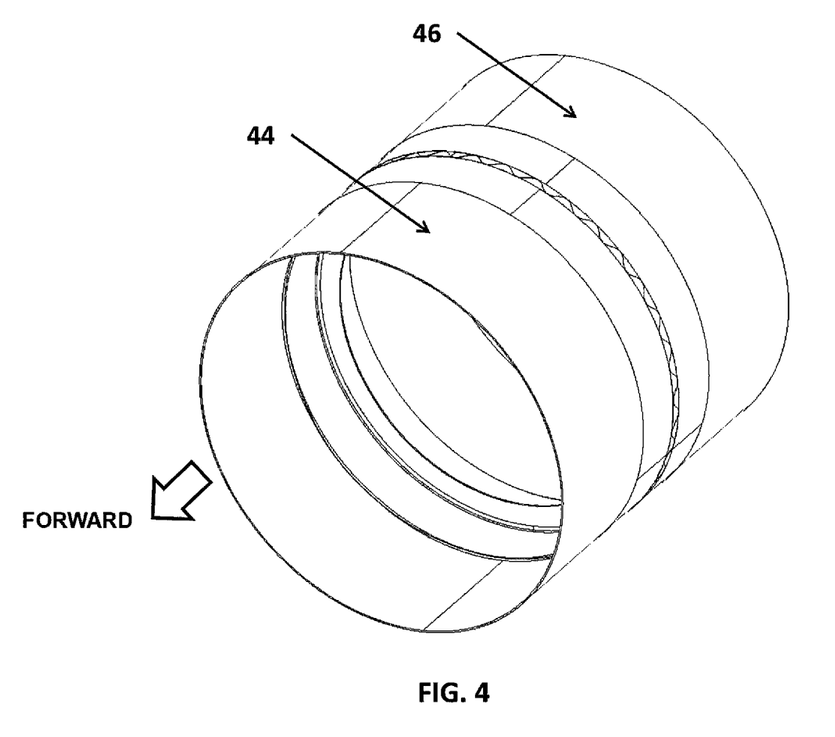
FIG. 4 is an out of scale representation of a perspective view of two connected aircraft fuselage sections of the aircraft fuselage.
Figure 5:
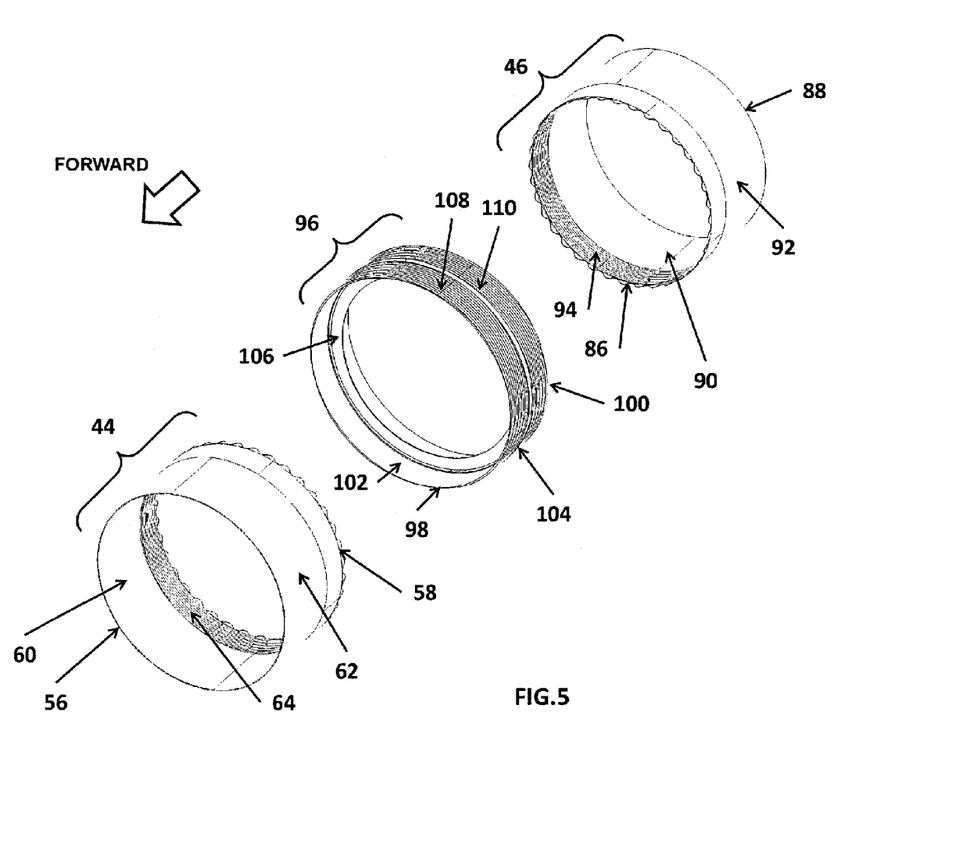
FIG. 5 is a view similar to that of FIG. 4, but showing the two aircraft fuselage sections in "an exploded view" with the sleeve between them.

FIGS. 4 and 5 show representations of the rear portion of the first fuselage section 44 and the forward portion of the second fuselage section 46 removed from the aircraft fuselage 42 shown in FIG. 3. The representations of the first 44 and second 46 fuselage sections shown are simplified and out of scale with the thread enlarged for better visualization and to simplify the description of the fuselage sections.

The rear part of the first fuselage section 44 has a cylindrical length with opposite forward 56 and rearward 58 circular edges, a cylindrical interior surface 60 and an opposite cylindrical exterior surface 62. A first screw thread 64 is formed in the interior surface 60 of the first fuselage section 44 adjacent the rearward edge 58 of the section. The first screw thread 64 spirals around the interior surface 60 of the first fuselage section 44 in a first direction from the rearward edge 58 into the first fuselage section 44. In the example shown in FIG. 5 the first direction of the first screw thread 64 is clockwise or a right-hand thread.

Figure 6:
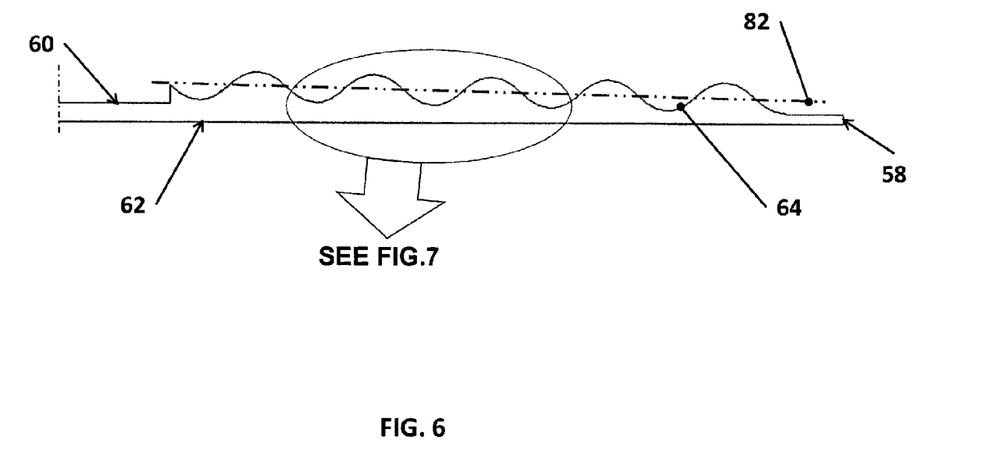
FIG. 6 is a partial cross-section view of the first screw thread on the first fuselage section.
Figure 7:
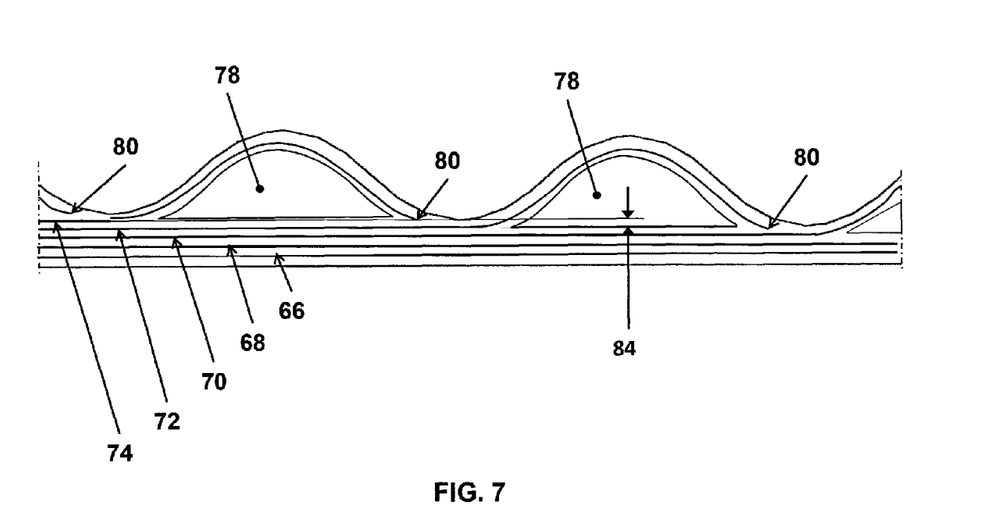
FIG. 7 is an enlarged partial cross-section view of the first screw thread on the first fuselage section.

FIGS. 6 and 7 show cross-section details of the construction of the first thread 64 on the first fuselage section 44. FIG. 6 is a representation of a cross-section of the first fuselage section 44 taken through the bottom of the cylindrical section with the rearward edge 58 of the section shown to the right and the forward edge being to the left. FIG. 7 is an enlarged partial view representing the fuselage section's construction. In FIG. 7 it can be seen that the first fuselage section 44 is comprised of a plurality of structural composite (fiber reinforced plastic) layers (66, 68, 70, 72, 74 are shown, but their number can be different, depending on the number of the thread's humps) and a unidirectional composite piece or noodle 78 (this one is perpendicular to the picture). The noodle 78 spirals around the interior of the first fuselage section 44 and forms the foundation of the first screw thread 64. Note, that any of the layers 66, 68, 70, 72 and 74 can consist of many laminas. The number of these laminas and their orientation within one layer depend on the engineering requirements. To keep tight tolerances of the thread's profile it is advisable to form the thread on a mold complementary to the thread profile and located inside of the thread. The first layer of composite 74 is laid outside of the mold all along the fuselage section 44 but terminated at the end of the first hump of the thread. Now the first hump is filled with the noodle 78. The second layer of composite 72 is laid on the top of the previous layer 74 along the fuselage section 44, over the noodle and terminated at the end of the second hump of the thread. The second hump of the thread is filled by the same noodle 78. This process is repeated to address all of the humps of the thread and is not limited to the small segment shown in FIG. 7. Termination points of the layers are labeled 80. The last layer of the composite 66 covers the entire length of the fuselage section 44 up to the rear edge 58. This last layer creates the external surface of the fuselage section 44 or the fuselage's outer mold line (OML). The first screw thread 64 has a thread profile similar to the Edison thread and is based on a conical surface as represented by the phantom line 82 in FIG. 6. Thus, the interior diameter dimension of the first thread 64 becomes gradually smaller as the first thread 64 spirals across the interior surface 60 of the first fuselage section 44 from the rearward edge 58 of the section toward the forward edge 56 of the fuselage section 44. The increments of the cone's radius 84 are caused by the gradual increase of the number of layers with given thickness. The conical base 82 of the thread can help the proper engagement between the sleeve and fuselage section at the beginning of the screwing process and will allow access for adhesive squeezed through the connection.

The second fuselage section 46 is basically a mirror image of the first fuselage section 44. The second fuselage section 46 is also constructed having a cylindrical length with opposite forward 86 and rearward 88 circular edges, a cylindrical interior surface 90 and an opposite cylindrical exterior surface 92. A second screw thread 94 is also formed on the second fuselage section interior surface 90 adjacent the forward edge 86 of the fuselage section. The second screw thread 94 spirals around the interior surface of the second fuselage section 46 in a second direction from the forward edge 86 into the second fuselage section 46. The second spiraling direction of the second thread 94 is opposite to the first spiraling direction of the first thread 64. For example, with the first thread 64 being a right-hand thread, the second thread 94 would be a left-hand thread. Stated differently, if the first screw thread 64 could spiral around the first fuselage section 44 in a clockwise direction then the second screw thread 94 could spiral around the second fuselage section 46 in a counterclockwise direction. The second screw thread 94 is constructed in the same manner as the first screw thread 64 described earlier. Therefore, the construction of the second screw thread 94 will not again be described. In the above-described embodiments of the first fuselage section 44 and the second fuselage section 46, both the first fuselage section 44 and its screw thread 64 are constructed of composite material as one unit and the second fuselage section 46 and its screw thread 94 are constructed of composite material as one unit.

Figure 8:
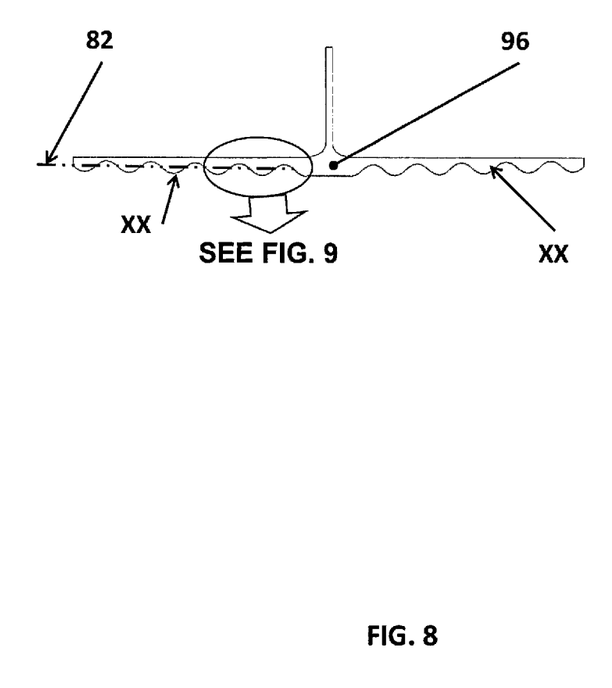
FIG. 8 is a cross-section view of the first screw thread on the sleeve.
Figure 9:
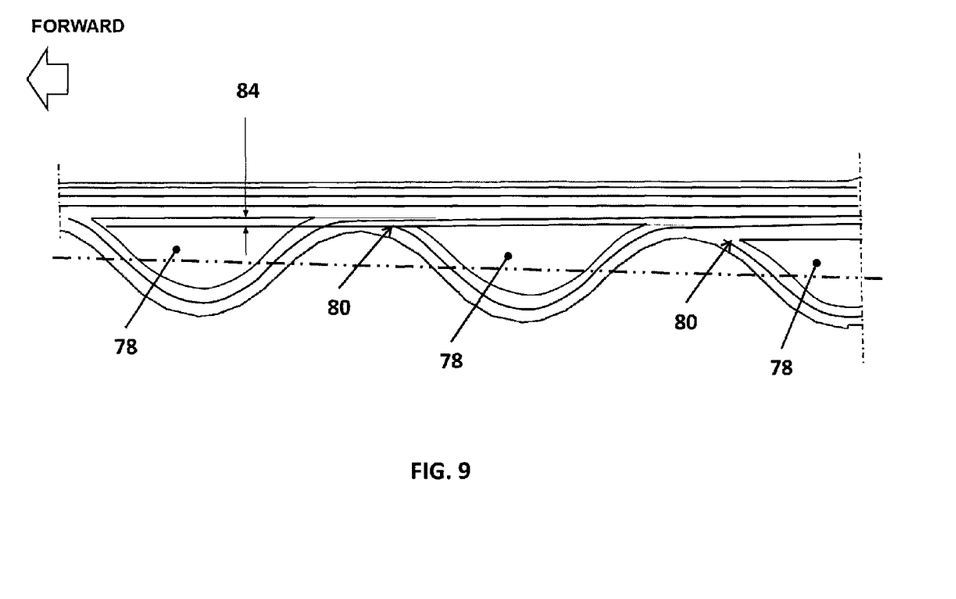
FIG. 9 is an enlarged partial cross-section view of the first screw thread on the sleeve.

The first fuselage section 44 and the second fuselage section 46 are joined together by a cylindrical sleeve 96. FIG. 5 shows the cylindrical sleeve 96 prior to its assembly to the first fuselage section 44 and the second fuselage section 46. The sleeve 96 has a cylindrical length with opposite forward 98 and rearward 100 circular edges and opposite interior 102 and exterior 104 cylindrical surfaces. The internal cylindrical surface 102 can have a flange 106 acting as the frame and as a handle during the screwing process. A first screw thread 108 on the sleeve 96 is formed on the sleeve exterior surface 104 adjacent the sleeve forward edge 98 to mate with the first screw thread 64 formed on the interior surface of the first fuselage section 44 and to complementary to the first screw thread 64 on the first fuselage section 44. A second screw thread 110 is also formed on the sleeve exterior surface 104 adjacent the sleeve rearward edge 100. The second screw thread 110 is formed on the sleeve exterior surface 104 to mate with the second screw thread 94 formed on the second fuselage section 46 interior surface 90. The second screw thread 110 on the sleeve 96 is complementary to the second screw thread 94 on the second fuselage section. The sleeve second screw thread 110 mates with the second screw thread 94 on the second fuselage section 46 securing the sleeve to the second fuselage section. The construction of the sleeve 96 is represented in FIG. 8 and FIG. 9 and is similar to the construction of the first screw thread 64 and second screw thread 94 on the respective first and second fuselage sections 44 and 46. Therefore, the construction of the first 108 and second 110 screw threads on the sleeve 96 will not again be described in detail, except for the clarification that the threads 108 and 110 on the sleeve should be formed inside (not outside) a specially built mold to achieve good dimensional tolerances. With the first 108 and second 110 screw threads on the sleeve 96 being so constructed, the sleeve 96 with the first screw thread 108 and with the second screw thread 110 are constructed of composite material as one unit.

It is necessary to stress, that sleeve 96 can be alternatively produced entirely of metal, depending on the production conveniences, costs and engineering analyzes.

Figure 10:
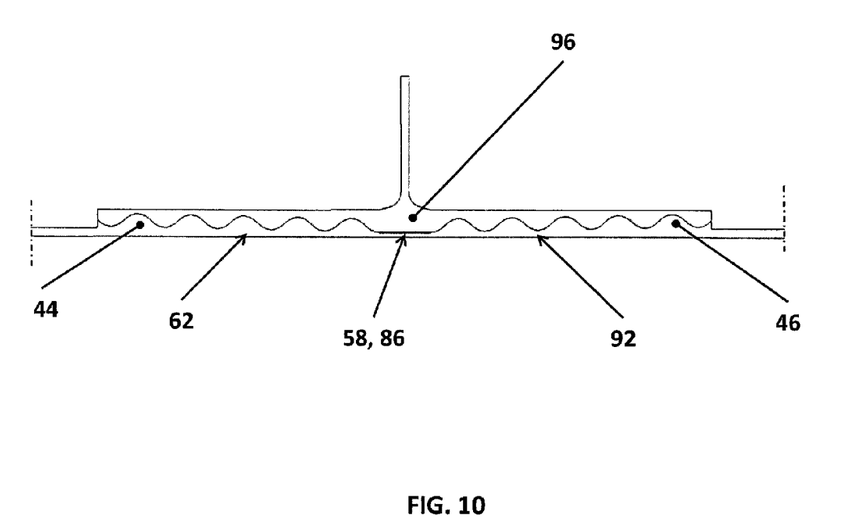
FIG. 10 is a partial cross-section view of the secured connection between the first and second fuselage sections provided by the sleeve.
Figure 14:
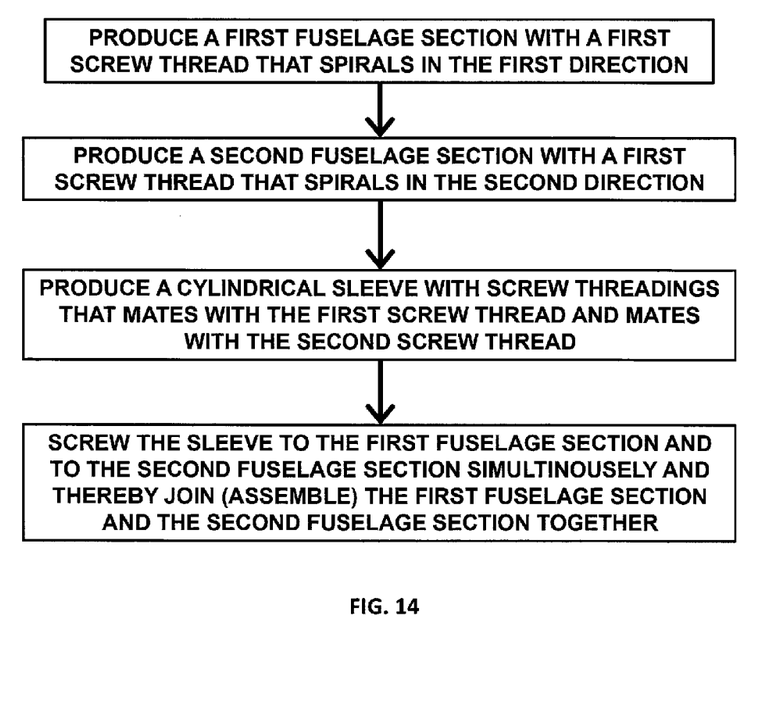
FIG. 14 is a flow diagram of the assembling process of joining two fuselage sections by screwing two of them with the threaded sleeve.

The process of securing the first fuselage section 44 to the second fuselage section 46 is accomplished by rotating the sleeve 96 relative to the first fuselage section and the second fuselage section. This process is represented in FIG. 14. The first 44 and second 46 fuselage sections are secured against rotation, but are free to move toward each other in translatory movements. The sleeve 96 is positioned between the first fuselage section 44 and the second fuselage section 46. The first screw thread 108 on the sleeve 96 is engaged in or mated with the first screw thread 64 on the first fuselage section 44 at the rearward edge 58 of the first fuselage section. The second screw thread 110 on the sleeve 96 is engaged in or mated with the second screw thread 94 on the second fuselage section 46 at the forward edge 86 of the second fuselage section. These two engagements have to be accomplished simultaneously. The sleeve 96 is then rotated relative to the first 44 and second 46 fuselage sections. The direction of this rotation has to be determined to achieve movement of the sleeve deep into the first 44 and second 46 fuselage sections. Due to the opposite spiraling directions of the first screw thread 64 on the first fuselage section 44 and the second screw thread 94 on the second fuselage section 46, the proper direction of the rotation of the sleeve 96 should pull the first 44 and second 46 fuselage sections toward each other. The rotation of the sleeve 96 is continued until the rearward edge 58 of the first fuselage section 44 engages with the forward edge 86 of the second fuselage section 46, thereby securing together the first and second fuselage sections as represented in FIG. 10.

In this embodiment of the aircraft fuselage, the rearward edge 58 of the first fuselage section 44 has a non-linear configuration. The forward edge 86 of the second fuselage section 46 also has a non-linear configuration. The non-linear configurations of the first fuselage section rearward edge 58 and the second fuselage section forward edge 86 are complementary. When the non-linear configurations of the first fuselage section rearward edge 58 and the second fuselage section forward edge 86 engage with each other, the configurations form a secure joint between the two fuselage sections that transfers torsion and shear forces between the two fuselage sections.

Figure 11:
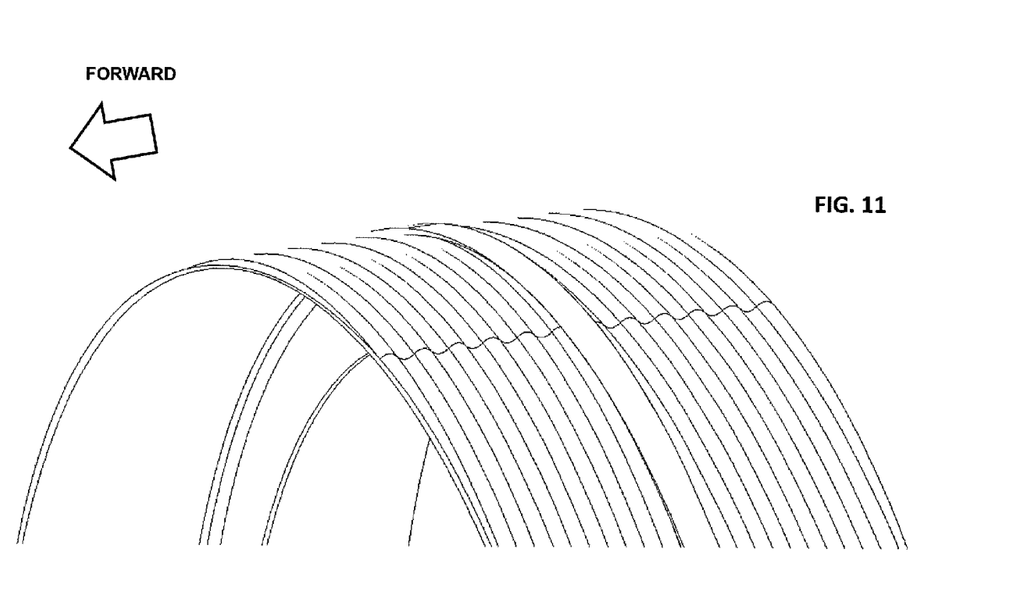
FIG. 11 is an enlarged partial view of the sleeve of FIG. 5.

FIG. 11 is an enlarged partial view of the sleeve showing details of the sleeve 96.

Figure 12:
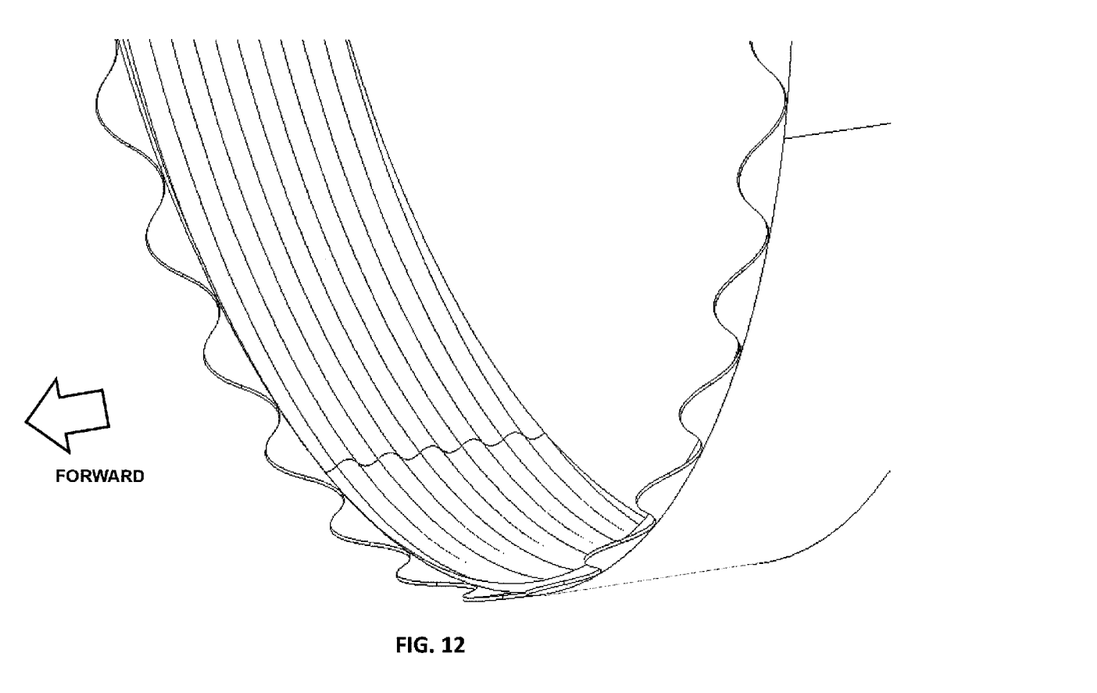
FIG. 12 is an enlarged partial view of the interior of the second aircraft fuselage section.

FIG. 12 is an enlarged partial view of the interior of the second fuselage section 46.

Figure 13:
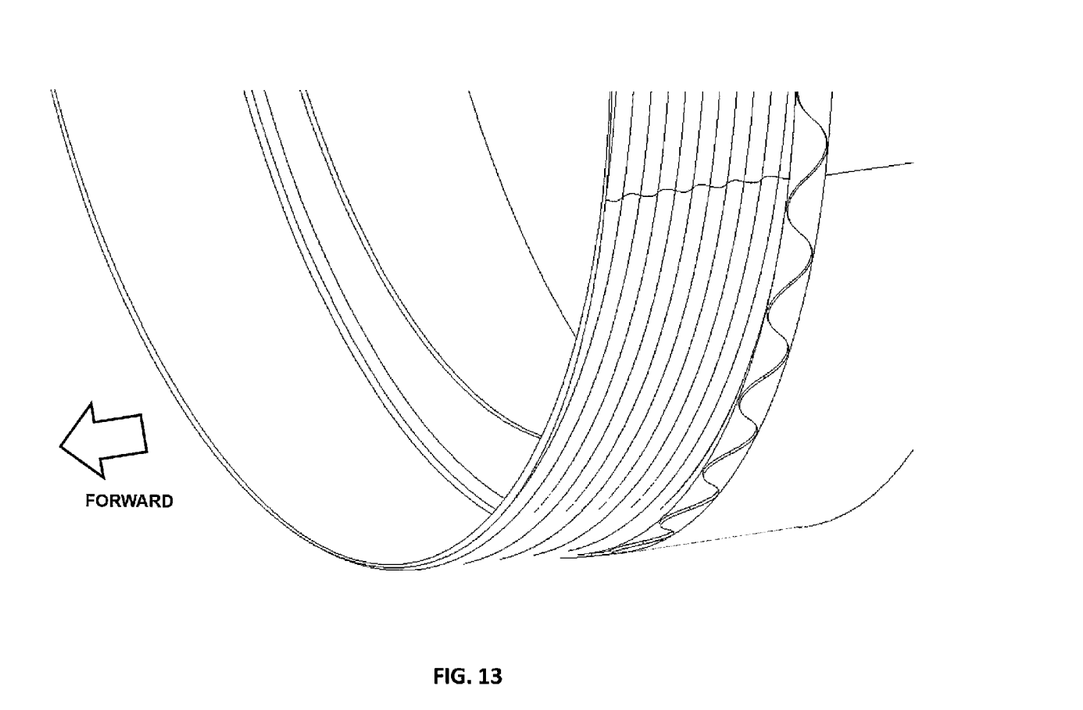
FIG. 13 is an enlarged partial view of the sleeve secured to the second fuselage section (the first fuselage section removed for clarity).

FIG. 13 is an enlarged partial view of the sleeve secured to the second fuselage section showing the detail of the assembly of sleeve 96 and second fuselage section 46 (the first fuselage segment 44 is not shown for better clarity).

An adhesive can be used to prevent the sleeve rotation relative to the fuselage sections after assembly. This adhesive (still in a liquid or paste state) can be additionally employed as a lubricant during the screwing process The aircraft fuselage of this disclosure and its method of construction enable the elimination of substantially all of the splicing parts and the mechanical fasteners needed in current methods of constructing an aircraft fuselage by joining several cylindrical fuselage sections. With the elimination of the splices and the mechanical fasteners, both the time required for assembling fuselage sections together and costs of the operation could be substantially reduced. Additionally, the elimination of the mechanical fasteners also could reduce the weight of the fuselage.

FIG. 14 shows the block flow diagram of the process of joining two fuselage sections. It should be understood that this process can be repeatedly applied to join all fuselage sections.

It should be understood that the geometrical parameters of threads used can be different from those shown in this particular concept. Profile of the thread, number of threads around the circumference and the angle of sleeve rotation for full engagement have to be determined during engineering design taking under consideration (among others) loads, material capabilities and manufacturing concerns.

As various modifications could be made in the construction of the aircraft fuselage described and illustrated herein without departing from the scope of the disclosure, it is intended that all matter contained in the foregoing description or shown in the accompanying drawings shall be interpreted as illustrative rather than limiting. Thus, the breadth and scope of the aircraft fuselage disclosure should not be limited by any of the above described exemplary embodiments, but should be defined only in accordance with the following claims appended hereto and their equivalents.

The invention claimed is:

1. An aircraft fuselage comprising:
a first fuselage section, the first fuselage section having a length with a forward end and an opposite rearward end, a first screw thread on the first fuselage section adjacent the rearward end, the first screw thread spiraling around the first fuselage section;
a second fuselage section, the second fuselage section having a length with a forward end and an opposite rearward end, a second screw thread on the second fuselage section adjacent the forward end, the second screw thread spiraling around the second fuselage section;
a sleeve, the sleeve having a length with a forward end and an opposite rearward end, screw threading on the sleeve, the screw threading on the sleeve mating with the first screw thread on the first fuselage section and the screw threading on the sleeve mating with the second screw thread on the second fuselage section, the screw threading on the sleeve securing together the first and second fuselage sections.

2. The aircraft fuselage of claim 1, further comprising:
the first fuselage section being constructed of composite material; and,
the second fuselage section being constructed of composite material.

3. The aircraft fuselage of claim 2, further comprising:
the first screw thread on the first fuselage section being constructed of composite material; and,
the second screw thread on the second fuselage section being constructed of composite material.

4. The aircraft fuselage of claim 3, further comprising:
the sleeve being constructed of composite material.

5. The aircraft fuselage of claim 3, further comprising:
the sleeve being constructed of metal.

6. The aircraft fuselage of claim 1, further comprising:
the first fuselage section rearward end having a circular rearward edge;

the second fuselage section forward end having a forward edge; and, the first fuselage section rearward edge engaging against the second fuselage section forward edge.

7. The aircraft fuselage of claim 6, further comprising:

the first fuselage section rearward edge having a non-linear configuration;

the second fuselage section forward edge surface having a non-linear configuration; and, the non-linear configurations of the first fuselage section rearward edge surface and the second fuselage section forward edge surface being complementary.

8. The aircraft fuselage of claim 1, further comprising:

the first screw thread on the first fuselage section spiraling around the first fuselage section in a first direction;

the second screw thread on the second fuselage section spiraling around the second fuselage section in a second direction; and, the first and second directions being opposite directions.

9. The aircraft fuselage of claim 1, further comprising:

the first fuselage section having an interior surface and an opposite exterior surface, the first screw thread being on the interior surface of the first fuselage section;

the second fuselage section having an interior surface and an opposite exterior surface, the second screw thread being on the interior surface of the second fuselage section; and, the sleeve having an interior surface and an opposite exterior surface, the screw threading on the sleeve being on the sleeve exterior surface.

10. An aircraft fuselage comprising:

a cylindrical first fuselage section, the first fuselage section having a length with opposite forward and rearward ends, the first fuselage section having a circular rearward edge at the rearward end, a first screw thread on the first fuselage section adjacent the rearward edge, the first screw thread spiraling around the first fuselage section in a first direction;

a cylindrical second fuselage section, the second fuselage section having a length with opposite forward and rearward ends, a circular forward edge at the second fuselage section forward end, a second screw thread on the second fuselage section adjacent the forward edge of the second fuselage section, the second screw thread spiraling around the second fuselage section in a second direction, the first direction and the second direction being opposite; and, a cylindrical sleeve, the sleeve having a length with opposite circular forward and rearward edges, a first screw thread on the sleeve adjacent the sleeve forward edge, the first screw thread on the sleeve being complementary to and mating with the first screw thread on the first fuselage section securing the sleeve to the first fuselage section, and a second screw thread on the sleeve adjacent the sleeve rearward edge, the second screw thread on the sleeve being complementary to and mating with the second screw thread on the second fuselage section securing the sleeve to the second fuselage section, the sleeve securing the first fuselage section to the second fuselage section.

11. The aircraft fuselage of claim 10, further comprising:

the first fuselage section being constructed of composite material; and, the second fuselage section being constructed of composite material.

12. The aircraft fuselage of claim 11, further comprising:

the sleeve being constructed of composite material.

13. The aircraft fuselage of claim 10, further comprising:

the first fuselage section rearward edge engaging against the second fuselage section forward edge.

14. The aircraft fuselage of claim 13, further comprising:

the first fuselage section rearward edge having a non-linear configuration;

the second fuselage section forward edge having a non-liner configuration; and, the non-linear configurations of the first fuselage section rearward edge and the second fuselage section forward edge being complementary.

15. The aircraft fuselage of claim 10, further comprising:

the first fuselage section having an interior surface and an opposite exterior surface, the first screw thread being on the interior surface of the first fuselage section;

the second fuselage section having an interior surface and an opposite exterior surface, the second screw thread being on the interior surface of the second fuselage section;

the sleeve having an interior surface and an opposite exterior surface, the screw threading on the sleeve being on the sleeve exterior surface.

16. The aircraft fuselage of claim 10, further comprising:

the first fuselage section and the first screw thread being constructed of composite material; and, the second fuselage section and the second screw thread being constructed of composite material.

17. A method of making an aircraft fuselage comprising:

constructing a cylindrical first fuselage section with the first fuselage section having a first screw thread that spirals around the first fuselage section;

constructing a cylindrical second fuselage section with the second fuselage section having a second screw thread that spirals around the second fuselage section;

securing the first fuselage section to the second fuselage section with a cylindrical sleeve having screw threading on the sleeve that mates with the first screw thread on the first fuselage section and mates with the second screw thread on the second fuselage section and secures together the first and second fuselage sections.

18. The method of claim 17, further comprising:

securing the first fuselage section to the second fuselage section by rotating the sleeve relative to the first fuselage section and to the second fuselage section while securing the first fuselage section and the second fuselage section against rotation.

19. The method of claim 17, further comprising:

constructing the first fuselage section with the first screw thread spiraling around the first fuselage section in a first direction; and, constructing the second fuselage section with the second screw thread spiraling around the second fuselage section in a second direction, the second direction being opposite the first direction.

20. The method of claim 17, further comprising:

constructing the sleeve of a composite material with the sleeve having screw threading that is complementary to and mates with the first screw thread on the first fuselage section and the sleeve having screw threading that is complementary to and mates with the second screw thread on the second fuselage section.

* * * * *